United States Patent
Yamazaki

(10) Patent No.: US 7,520,530 B2
(45) Date of Patent: Apr. 21, 2009

(54) GAS GENERATOR FOR AIR BAG

(75) Inventor: Masayuki Yamazaki, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 438 days.

(21) Appl. No.: 11/303,914

(22) Filed: Dec. 19, 2005

(65) Prior Publication Data

US 2006/0151977 A1    Jul. 13, 2006

Related U.S. Application Data

(60) Provisional application No. 60/639,311, filed on Dec. 28, 2004.

(30) Foreign Application Priority Data

Dec. 20, 2004    (JP) .............................. 2004-367542

(51) Int. Cl.
*B60R 21/16* (2006.01)
(52) U.S. Cl. ...................... 280/736; 280/741
(58) Field of Classification Search ................. 280/741, 280/736, 742
See application file for complete search history.

(56) References Cited

U.S. PATENT DOCUMENTS

| | | | |
|---|---|---|---|
| 5,622,380 A | 4/1997 | Khandhadia et al. | |
| 5,628,528 A | 5/1997 | DeSautelle et al. | |
| 5,839,754 A | 11/1998 | Schluter et al. | |
| 6,189,924 B1 | 2/2001 | Hock | |
| 6,412,815 B1 | 7/2002 | Nakashima et al. | |
| 6,540,256 B2 * | 4/2003 | Iwai et al. | 280/736 |
| 6,851,374 B1 * | 2/2005 | Kelley et al. | 102/530 |
| 6,860,511 B2 | 3/2005 | Patterson | |
| 6,942,249 B2 * | 9/2005 | Iwai et al. | 280/741 |
| 6,948,737 B2 | 9/2005 | Ohji et al. | |
| 2005/0151356 A1 * | 7/2005 | Ohji et al. | 280/741 |

FOREIGN PATENT DOCUMENTS

| | | |
|---|---|---|
| DE | 4019677 A1 | 1/1992 |
| DE | 19520847 A1 | 12/1996 |
| EP | 0449506 A1 | 10/1991 |
| EP | 1538137 A1 | 6/2005 |
| JP | 8-164816 A | 6/1996 |
| JP | 8-332911 A | 12/1996 |
| JP | 2001-97176 A | 4/2001 |
| JP | 2003-191816 A | 7/2003 |
| JP | 2004-155645 A | 6/2004 |
| WO | WO-95/01946 A1 | 1/1995 |

* cited by examiner

*Primary Examiner*—Paul N. Dickson
*Assistant Examiner*—Drew J. Brown
(74) *Attorney, Agent, or Firm*—Birch, Stewart, Kolasch & Birch, LLP

(57) ABSTRACT

The present invention provides a gas generator for an air bag comprising:
a housing having a gas discharge port;
a plurality of combustion chambers charged with a gas generating agent, provided in the housing;
a single ignition device chamber accommodating a single ignition device, provided in the housing, the single ignition device chamber communicating directly with each of the plurality of combustion chambers via communication holes, respectively;
a combustion product generated by the activation of the single ignition device, passing through the communication holes, flowing into the respective combustion chambers to ignite and burn the gas generating agent charged into each combustion chamber;
the amounts of combustion products flowing through the communication holes into the combustion chambers, respectively, being controlled, at least at the beginning of the activation, such that the amounts may be different from one another.

10 Claims, 6 Drawing Sheets

GAS GENERATOR FOR AIR BAG

This nonprovisional application claims priority under 35 U.S.C. § 119(a) on Patent Application No. 2004-367542 filed in Japan on 20 Dec. 2004 and 35 U.S.C. § 119(e) on U.S. Provisional Application No. 60/639,311 filed on 28 Dec. 2004, which are incorporated by reference.

BACKGROUND OF THE INVENTION

1. Field of the Invention

The present invention relates to a gas generator for an air bag used in an air bag system-installed in a vehicle.

2. Description of the Related Art

A gas generator for an air bag preferably inflates the air bag as the amount of gas generated is varied over time, in order to reduce the impact of air bag inflation on the passenger while providing a sufficient restraining performance.

To inflate an air bag in this fashion, a known conventional gas generator employs two igniters to burn individual gas generating agents at different times. However, the structure of this gas generator is complicated, and the use of two igniters makes assembly difficult and leads to an increase in manufacturing costs.

JP-A No. 8-332911 relates to a gas generator for an air bag, and discloses in FIG. 19 thereof a device having the following constitution. Due to the existence of a throat portion 162, heated particles generated by an igniter 154 are stored in a first ignition chamber 163 and also introduced into a second ignition chamber 164. In other words, by providing the throat portion 162, the heated particles are injected into a first combustion chamber 155 from the first ignition chamber 163 through a communicating portion 165, whereupon pressure and heat in the second ignition chamber 164 reach predetermined values. Transmission of the pressure and heat into the second ignition chamber 164 are delayed by the throat portion 162, and therefore combustion in a second combustion chamber 156 can be delayed. The delay time is controlled by the size of the throat portion 162.

JP-A No. 8-164816 relates to a gas generator for an air bag, and aims to provide a gas generator of large capacity which is capable of carrying out the stable and even combustion of a gas generating agent having an intense combustion characteristic, such as a non-azide gas generating agent. The structure of the gas generator is disclosed in FIG. 1 and so on.

SUMMARY OF THE INVENTION

The present invention provides a gas generator for an air bag comprising, in a housing having a gas discharge port, a plurality of combustion chambers charged with a gas generating agent, a single ignition device chamber accommodating a single ignition device, the single ignition device chamber communicating directly with each of the plurality of combustion chambers via communication holes, respectively;

a combustion product generated by the activation of the single ignition device, passing through the communication holes, flowing into the respective combustion chambers to ignite and burn the gas generating agent charged into each combustion chamber, the amount of combustion products, that flows through the communication holes into the respective combustion chambers, being controlled at least at the beginning of the activation such that a different amount of combustion products flows into each combustion chamber.

The present invention also provides a gas generator for an air bag comprising:

a housing having a gas discharge port;

a plurality of combustion chambers charged with a gas generating agent, provided in the housing;

a single ignition device chamber accommodating a single ignition device, provided in the housing, the single ignition device chamber communicating directly with each of the plurality of combustion chambers via communication holes, respectively;

a combustion product generated by the activation of the single ignition device, passing through the communication holes, flowing into the respective combustion chambers to ignite and burn the gas generating agent charged into each combustion chamber;

the amounts of combustion products flowing through the communication holes into the combustion chambers, respectively, being controlled, at least at the beginning of the activation, such that the amounts may be different from one another.

The present invention further provides a gas generator, comprising:

a housing having a gas discharge port;

a first combustion chamber provided within the housing and accommodating therein a first gas generating agent;

a second combustion chamber provided within the housing and accommodating therein a second gas generating agent;

a single ignition device chamber provided within the housing, the single ignition device chamber including a first communication hole communicating the single ignition device chamber with the first combustion chamber and a second communication hole communicating the single ignition device chamber with the second combustion chamber;

a single ignition device accommodated in the single ignition device chamber and generating a combustion product by combustion thereof, a portion of the combustion product flowing into the first combustion chamber through the first communication hole to ignite the first gas generating agent and the rest of the combustion product flowing into the second combustion chamber through the second communication hole to ignite the second gas generating agent such that an amount of the portion of the combustion product is different from an amount of the rest of the combustion product at least an beginning of an activation of the gas generator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
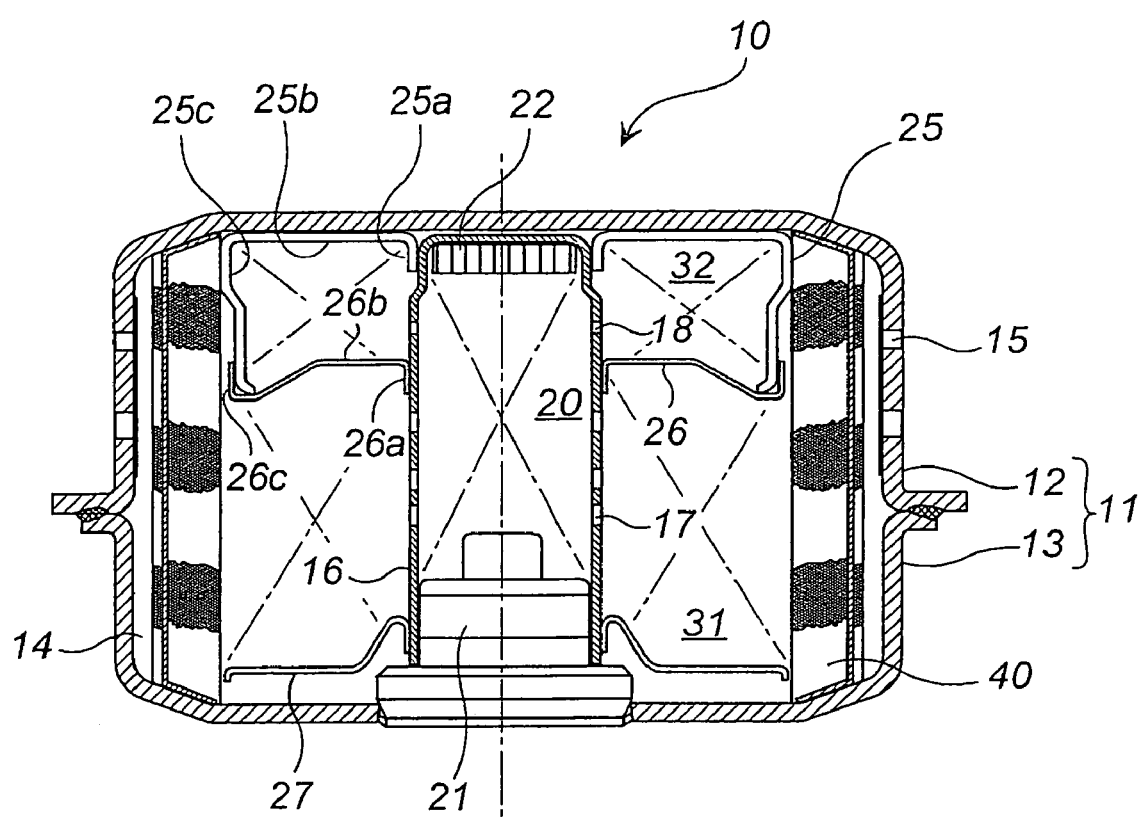
FIG. 1 shows an axial sectional view of a gas generator for an air bag.

The invention relates to a gas generator for an air bag which combines a single ignition device and a plurality of combustion chambers such that the amount of generated gas can be varied over time, enabling a small amount of gas to be generated quickly particularly in an initial activating stage, and a sufficient amount of gas to be generated thereafter.

The air bag gas generator of the present invention has a combination of a single ignition device and a plurality of combustion chambers, and hence, in comparison with a gas generator using two ignition devices, the structure thereof can be simplified and the manufacturing costs can be suppressed.

In the air bag gas generator of the present invention, the amount of combustion products (the high-temperature gas, flame, heat residue, and so on that are generated by an activation of the ignition device) flowing through the communication holes into the respective combustion chambers is controlled at least in the beginning of the activation (at the beginning of the activation of the ignition device) such that a different amount of combustion products flows into each combustion chamber, and although there are no particular limitations on the specific method of achieving this, it is preferable to provide a combustion chamber into which the combustion products flow easily and a combustion chamber into which the combustion products flow with difficulty.

With the combustion chamber into which the combustion products flow easily, more combustion products flow more quickly into the combustion chamber, and hence combustion begins earlier and advances more quickly. On the other hand, with the combustion chamber into which the combustion products flow with difficulty, the combustion products flow into the combustion chamber at a delay and in a smaller amount. Hence, differences in the ignition start timing and the ignition and combustion state can be provided between the combustion chambers.

As a result, each combustion chamber has a different ignition start timing, leading to a difference in the amount of gas that is generated over time. Therefore, gas (preferably a small amount of gas) is generated rapidly in the initial activating stage to inflate the air bag between the vehicle structure and the passenger (preferably, to inflate the air bag gently in order to reduce the impact when the air bag and passenger collide), whereupon more gas is generated to inflate the air bag fully so that a sufficient passenger restraining performance can be exhibited.

Hence, with the gas generator for an air bag according to the present invention, although combustion cannot be begun in two combustion chambers at arbitrary times, as in a dual type gas generator having two igniters and two combustion chambers, a temporal difference in the amount of gas that is generated from the two combustion chambers can be introduced, and therefore a substantially identical air bag inflation state to that of a dual type gas generator can be achieved. In other words, although the perfect two-stage inflation of a dual type gas generator (expressed by the tank pressure curve (S-shaped curve) obtained in a 60-liter tank test in FIG. 4 of JP-A No. 2003-191816, for example) cannot be achieved, a substantial two-stage inflation state (in which the tank pressure curve approximates an S-shaped curve) can be obtained.

The present invention further relates to the gas generator for an air bag wherein the communication holes of each combustion chamber have a different total opening area, and the amount of combustion products flowing into the respective combustion chambers is controlled at least at the beginning of the activation by the difference in the respective total opening areas of the communication holes such that a different amount of combustion products flows into each combustion chamber.

Differentiating the total opening area of the communication holes may employ a method of increasing or decreasing the number of communication holes, increasing or decreasing the diameter of the communication holes, or a combination of these methods.

For example, when there are two combustion chambers, the total opening area of first communication holes leading into a first combustion chamber is set to be greater than the total opening area of second communication holes leading into a second combustion chamber, enabling the combustion products to flow through the first communication holes more easily so that the gas generating agent in the first combustion chamber can be ignited and burned first. By adjusting the magnitude relation between the total opening areas of the respective communication holes in this manner, the amount of gas generated in each combustion chamber over time can be controlled.

As a result, the amount of gas generated over time in each combustion chamber can be made different for each combustion chamber, and therefore in the initial activating stage, gas (preferably a small amount of gas) is generated rapidly, mainly from the first combustion chamber, to inflate the air bag between the vehicle structure and the passenger (preferably, to inflate the air bag gently in order to reduce the impact when the air bag and passenger collide), while in the latter stage, more gas is generated mainly from the second combustion chamber to inflate the air bag fully so that a sufficient passenger restraining performance can be exhibited.

The present invention further relates to the gas generator for an air bag, wherein the communication holes are sealed by a sealing member, and the amount of combustion products flowing into the respective combustion chambers is controlled at least at the beginning of the activation by a difference in respective rupturing pressures of the sealing members such that a different amount of combustion products flows into each combustion chamber.

Aluminum adhesive tape, stainless steel adhesive tape, or another device may be used as the sealing member. The rupturing pressure may be adjusted employing a method of adjusting the thickness, adhesive strength, or another property of the sealing member. The adhesive tape is adhered to the communication holes from the combustion chamber side or the ignition device accommodating chamber side to seal the communication holes.

For example, when there are two combustion chambers, the rupturing pressure of a first sealing member sealing the first communication holes leading into the first combustion chamber is set to be smaller than the rupturing pressure of a second sealing member sealing the second communication holes leading into the second combustion chamber so that the first sealing member is ruptured first. Thus the combustion products flow into the first combustion chamber so that the gas generating agent therein can be ignited and burned first.

As a result, the amount of gas generated over time in each combustion chamber can be made different for each combustion chamber, and therefore in the initial activating stage, gas (preferably a small amount of gas) is generated rapidly, mainly from the first combustion chamber, to inflate the air bag between the vehicle structure and the passenger (preferably, to inflate the air bag gently in order to reduce the impact when the air bag and passenger collide), while in the latter stage, more gas is generated mainly from the second combustion chamber to inflate the air bag fully so that a sufficient passenger restraining performance can be exhibited.

The present invention further relates to the gas generator for an air bag, wherein the amounts of gas generated per unit time by the gas generating agents charged into the respective combustion chambers also differ from each other.

By adjusting at least one of the form, composition, compositional ratio, and charging amount of the gas generating agent, the amount of gas generated per unit time can be increased or decreased, and therefore, by charging gas generating agents having different forms or the like into each combustion chamber as described above, the generated gas amount can be controlled.

For example, by making the amount of the gas generated per unit time in the first combustion chamber smaller while increasing the total opening area, and making the amount of the gas generated per unit time in the second combustion chamber larger while decreasing the total opening area, a small amount of gas can be generated rapidly at the start of the activation to inflate the air bag gently (to reduce the impact when the air bag and passenger collide), whereupon a sufficient amount of gas can be generated so that a sufficient passenger restraining performance can be exhibited.

Conversely, by making the gas generating agent amount in the first combustion chamber larger (or equal) while increasing the total opening area, and making the gas generating agent amount in the second combustion chamber smaller (or equal) while decreasing the total opening area, gas can be generated over a longer time period, and hence the air bag can be maintained in an inflated state for a longer time period.

The present invention further relates to the gas generator for an air bag, wherein the plurality of combustion chambers are partitioned by a partitioning member, the partitioning member moves when a difference occurs in the combustion states of the plurality of combustion chambers, and as a result of the movement, a discharge path for discharging the gas that is generated in all of the combustion chambers is secured.

When there are two combustion chambers and gas generated in the first combustion chamber flows into the second combustion chamber, combustion in the second chamber may be begun by this gas. Alternatively, combustion in the second combustion chamber may begin properly, but when gas from the first combustion chamber flows in, it may become impossible to achieved proper gas discharge. As a result, it may become impossible to obtain the planned generated gas amount.

Hence, during combustion in the first combustion chamber, the first combustion chamber and second combustion chamber are maintained in a completely partitioned state by the partitioning member, while during combustion in the second combustion chamber, the partitioning member moves so that a gas discharge path is secured from the second combustion chamber to the gas discharge ports. In so doing, the faults described above do not occur.

There are no particular limitations on the method for moving the partitioning member. For example, since the gas generating agent in the first combustion chamber discharges gas through ignition and combustion first, while the gas generating agent in the second combustion chamber discharges gas through ignition and combustion at a delay, the existence of a gap produced when the gas generating agent in the first combustion chamber burns out, together with the pressure difference generated between the first combustion chamber and second combustion chamber, may cause the partitioning member to be pushed from the second combustion chamber side (while the existence of the gap causes the partitioning member to fall), and this phenomenon may be used to move the partitioning member. At this time, the gas generated in the second combustion chamber is discharged from the gas discharge ports via the first combustion chamber. Note that the partitioning member is preferably press-inserted rather than fixed to facilitate movement, or is attached in combination with another member to facilitate movement and falling.

The present invention further relates to the gas generator for an air bag, wherein the ignition device comprises an electric igniter that is activated by an ignition current, and a transfer charge that is ignited and burned by an activation of the electric igniter to generate the combustion products, and the transfer charge is a gas generating agent having a gas output of not less than 1.2 mol/100 g.

When a gas generating agent is used as the transfer charge, a sufficient amount of combustion products can be secured, and the amount of gas for inflating the air bag can be increased. An example of this gas generating agent contains 20% to 60% by mass of nitroguanidine as a fuel, 40% to 65% by mass of strontium nitrate as an oxidant, 3% to 12% by mass of CMCNa as a binder, and 1% to 20% by mass of a slag forming agent.

The gas generator for an air bag according to the present invention has a single igniter and a plurality of combustion chambers, enabling a simplified structure and a reduction in manufacturing costs. However, this gas generator is capable of performing a similar operation to that of a gas generator having a plurality of igniters and a plurality of combustion chambers, and therefore the passenger restraining performance can be enhanced.

EMBODIMENTS OF THE INVENTION (1) Gas Generator of FIG. 1

FIG. 1 shows an axial sectional view of an air bag gas generator 10 which is suited for use as a gas generator for a driver side.

A housing 11 is formed by integrating a diffuser shell 12 and a closure shell 13 by means of welding, and a plurality of gas discharge ports 15 are provided on a side face of the diffuser shell 12. The plurality of gas discharge ports 15 may have the same diameter or different diameters, and are sealed from the inside with a sealing tape to prevent the infiltration of moisture.

An inner cylinder, one end of which is closed and the other end of which is open, is disposed in the center of the housing 11. The interior of the inner cylinder 16 serves as an ignition device chamber 20, the closed surface of the inner cylinder 16 contacts a ceiling surface of the diffuser shell 12, and a single electric igniter 21 is fitted into the opening portion such that outside air (moisture) does not infiltrate the interior of the housing 11. The igniter 21 is connected to a vehicle battery via a lead wire.

A transfer charge is charged into the ignition device chamber 20, and a cushion member 22 is disposed on the ceiling surface thereof. The transfer charge is preferably a gas generating agent having a gas output of not less than 1.2 mol/100 g, and more preferably a gas generating agent having a gas output of not less than 1.4 mol/100 g.

An annular space exists on the periphery of the inner cylinder 16, and the annular space is divided into upper and lower sections by a retainer 25 and a partitioning member 26, the lower section forming a first combustion chamber 31 and the upper section forming a second combustion chamber 32. A retainer 27 is also disposed in the first combustion chamber 31 to adjust the volume of the first combustion chamber 31 in accordance with the amount of charged gas generating agent.

A first gas generating agent is charged into the first combustion chamber 31, and a second gas generating agent is charged into the second combustion chamber 32. The composition (contained components) compositional ratio (proportions of the contained components), and charging amount of the first gas generating agent and second gas generating agent may be identical or different, but are preferably determined in relation to the total opening area of first communication holes 17 and the total opening area of second communication holes 18.

There are no particular limitations on the form of the gas generating agent, and forms such as a well-known disk form, columnar form, and single-hole columnar form (see FIG. 3) may be applied. A gas generating agent having a well-known composition and compositional ratio, which is disclosed in JP-A No. 2004-155645, may be used. An example of the composition and compositional ratio of the gas generating agent contains 30% to 60% by mass of guanidine nitrate as a fuel, 30% to 60% by mass of basic copper nitrate as an oxidant, and 3% to 10% by mass of aluminum hydroxide.

A cylindrical coolant/filter 40 for filtering and cooling combustion gas is disposed between the first and second combustion chambers 31, 32 and the gas discharge ports 15, and an annular space 14 exists between the coolant/filter 40 and the gas discharge ports 15.

The retainer 25 includes an inside annular portion 25a contacting the inner cylinder 16, an annular base portion 25b contacting the ceiling surface of the diffuser shell 12, and an outside annular portion 25c partially contacting the coolant/filter 40. The inside annular portion 25a and outside annular portion 25c extend in the same direction, and by adjusting the length of the outside annular portion 25c, the volume of the first combustion chamber 32 can be increased or decreased. The retainer 25 is press-inserted before the diffuser shell 12 and closure shell 13 are joined, and is disposed by having the inside annular portion 25a and outside annular portion 25c pressed against the inner cylinder 16 and coolant/filter 40, respectively.

The partitioning member 26 includes an inside bent portion 26a which contacts the inner cylinder 16, a step surface portion 26b, and an outside bent portion 26c, the inside bent portion 26a and outside bent portion 26c extending in opposite directions. The partitioning member 26 is attached, after the insertion of the retainer 25, by bringing the inside bent portion 26a into contact with the inner cylinder 16 and hooking the outside bent portion 26c around the tip end portion of the outside annular portion 25c. At this time, inward radial force generated by the shape of the step surface portion 26b is applied to the outside bent portion 26c, and moreover, the outside bent portion 26c is supported by the first gas generating agent charged into the first combustion chamber 31, and therefore the partitioning member 26 does not fall under normal vehicle moving conditions.

The circular first communication holes 17 provided in a single row of three holes in the axial direction and at four holes having equal intervals in the circumferential direction (12 holes each having a diameter of 3 mm, producing a total opening area of approximately 340 mm$^2$) are formed in the peripheral surface of the inner cylinder 16 facing the first combustion chamber 31, and the circular second communication holes 18 provided in a single row of one hole in the axial direction and at four holes having equal intervals in the circumferential direction (4 holes each having a diameter of 2 mm, producing a total opening area of approximately 50 mm$^2$) are formed in the peripheral surface of the inner cylinder 16 facing the second combustion chamber 32.

Hence, the total opening area of the first communication holes 17 is approximately 6.8 times greater than the total opening area of the second communication holes 18, leading to a clear difference between the amount of combustion products that flow over time into the first combustion chamber 31 through the first communication holes 17 and the amount of combustion products that flow over time into the second combustion chamber 32 through the second communication holes 18.

Next, an operation of the air bag gas generator 10 shown in FIG. 1 when incorporated into a vehicle air bag system will be described. Note that the form, composition, and compositional ratio of the first gas generating agent and second gas generating agent are identical, while the charging amounts thereof are different (65 g of the first gas generating agent and 26 g of the second gas generating agent).

When the igniter 21 is activated, the transfer charge charged into the ignition device chamber 20 is ignited and burned, generating combustion products (high-temperature gas, a flame, and heat residue). At this time, the cushion member 22 burns together with the transfer charge.

The combustion products generated in the ignition device chamber 20 flow into the first combustion chamber 31 through the first communication holes 17 to ignite and burn the first gas generating agent, and flow into the second combustion chamber 32 through the second communication holes 18 to ignite and burn the second gas generating agent.

Since the total opening area of the first communication holes 17 is approximately 6.8 times greater than the total opening area of the second communication holes 18, the combustion products flow through the first communication holes 17 more quickly and in a larger amount. As a result, combustion begins first in the first combustion chamber 31, into which more combustion products have flowed more quickly, and therefore combustion progresses quickly, while the start and progression of combustion in the second combustion chamber 32 is delayed.

Although a difference occurs between the two combustion chambers in the state of combustion progression, the second combustion chamber 32 is surrounded by the inner cylinder 16, retainer 25, and partitioning member 26, and therefore the combustion gas generated in the first combustion chamber 31 does not flow directly into the second combustion chamber 32. Moreover, the combustion gas that is discharged into the annular space 14 does not pass back through the coolant/filter 40 to enter the second combustion chamber 32.

Furthermore, as described above, combustion progresses more quickly in the first combustion chamber 31 than in the second combustion chamber 32, and therefore when combustion progresses in the second combustion chamber 32, the partitioning member 26 is pushed downward (falls) from the second combustion chamber 32 side due to the gap that is formed in the first combustion chamber 31 by combustion of the first gas generating agent, and the pressure difference that is generated between the first combustion chamber 31 and second combustion chamber 32. As a result, the first combustion chamber 31 and second combustion chamber 32 are connected, forming a gas discharge path which extends from the second combustion chamber 32 to the gas discharge ports 15.

As a result of the difference between the amounts of combustion products that flow into the two combustion chambers from the ignition device chamber 20, the gas that passes through the coolant/filter 40, ruptures the sealing tape, and is discharged through the gas discharge ports 15 to inflate the air bag in the initial combustion stage is mainly the gas generated in the first combustion chamber 31, while the gas that passes through the coolant/filter 40, ruptures the sealing tape, and is discharged through the gas discharge ports 15 to inflate the air bag further in the latter combustion stage is mainly the gas generated in the second combustion chamber 32.

As a result of the difference in the amounts of gas that are generated over time in the two combustion chambers, gas (preferably a small amount of gas) is generated rapidly in the initial activating stage to inflate the air bag between the vehicle structure and the passenger (preferably, to inflate the air bag gently in order to reduce the impact when the air bag and passenger collide), whereupon more gas is generated to inflate the air bag fully so that a sufficient passenger restraining performance can be exhibited.

Figure 2:
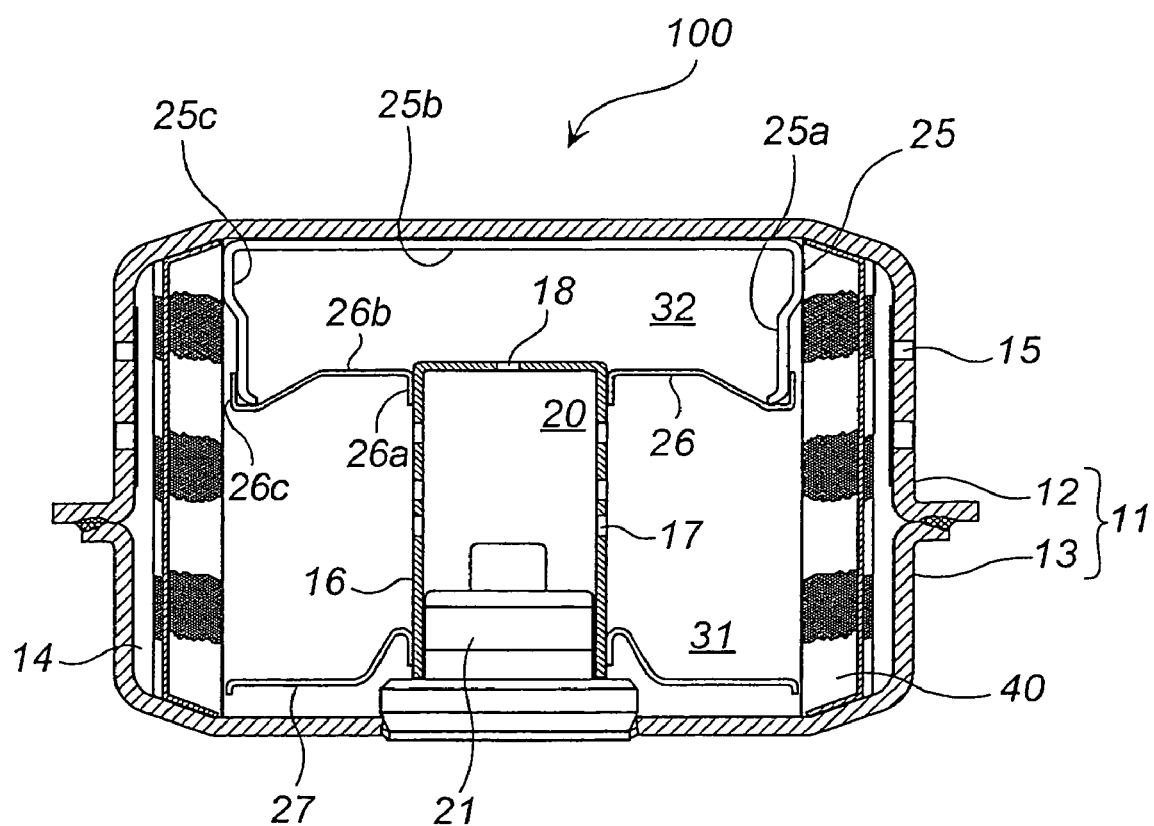
FIG. 2 shows an axial sectional view of a gas generator for an air bag.

(2) Gas Generator of FIG. 2

FIG. 2 shows an axial sectional view of an air bag gas generator 100. The basic structure of the gas generator 100 is identical to that of the gas generator 10 shown in FIG. 1, and therefore identical numbers to those of FIG. 1 denote identical elements.

In FIG. 2, the height of the inner cylinder 16 is lower than the height of the inner cylinder 16 in FIG. 1, and the second combustion chamber 32 is provided not only on the periphery of the inner cylinder 16, but also thereabove. The first communication holes 17 are provided in the peripheral surface of the inner cylinder 16 facing the first combustion chamber 31, and the second communication holes 18 are provided in the ceiling surface of the inner cylinder 16 facing the second combustion chamber 32.

The air bag gas generator 100 is suited for use as a gas generator for a driver side, and since the total opening area of the first communication holes 17 is greater than the total opening area of the second communication holes 18, the gas generator 100 performs an identical operation to the air bag gas generator 10.

Figure 3:
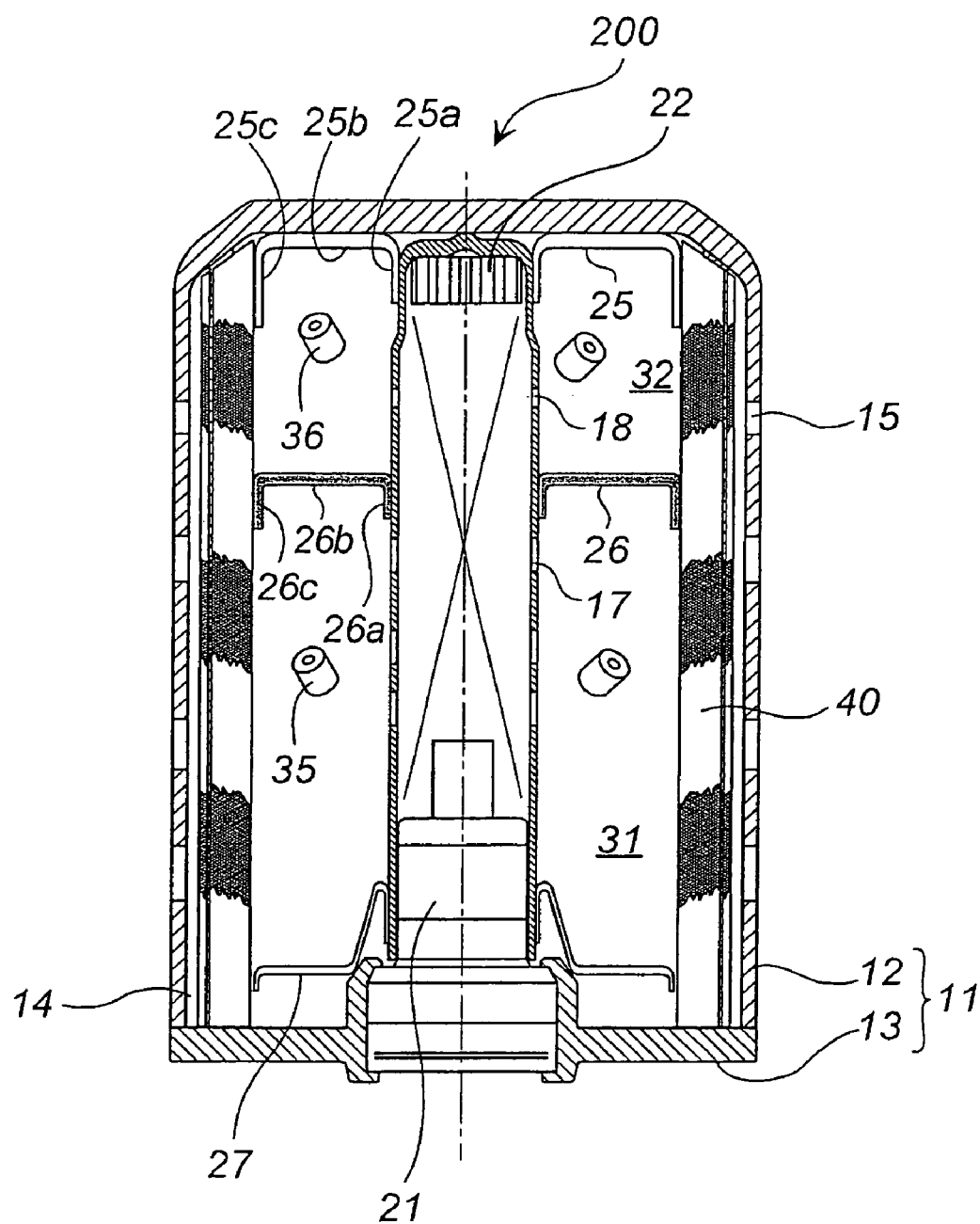
FIG. 3 shows an axial sectional view of a gas generator for an air bag.

(3) Gas Generator of FIG. 3

FIG. 3 shows an axial sectional view of an air bag gas generator 200. The basic structure of the gas generator 200 is identical to that of the gas generator 10 shown in FIG. 1, and therefore identical numbers to those of FIG. 1 denote identical elements. Note that 35 denotes a first gas generating agent, and 36 denotes a second gas generating agent.

The air bag gas generator 200 takes a vertical rectangular form and is suited for use as an air bag gas generator for a front passenger side. In the air bag gas generator 200, the total opening area of the first communication holes 17 is greater than the total opening area of the second communication holes 18, and therefore the gas generator 200 performs an identical operation to the air bag gas generator 10.

Note that as the combustion gas generated in the first combustion chamber 31 passes through the coolant/filter 40 to reach the annular space 14 and is discharged through the gas discharge ports 15, a part of the combustion gas may flow back through the coolant/filter 40 into the second combustion chamber 32. However, by passing through the coolant/filter 40 twice, the combustion gas is cooled, and hence there is no danger of this combustion gas igniting and burning the second gas generating agent 36.

Figure 4:
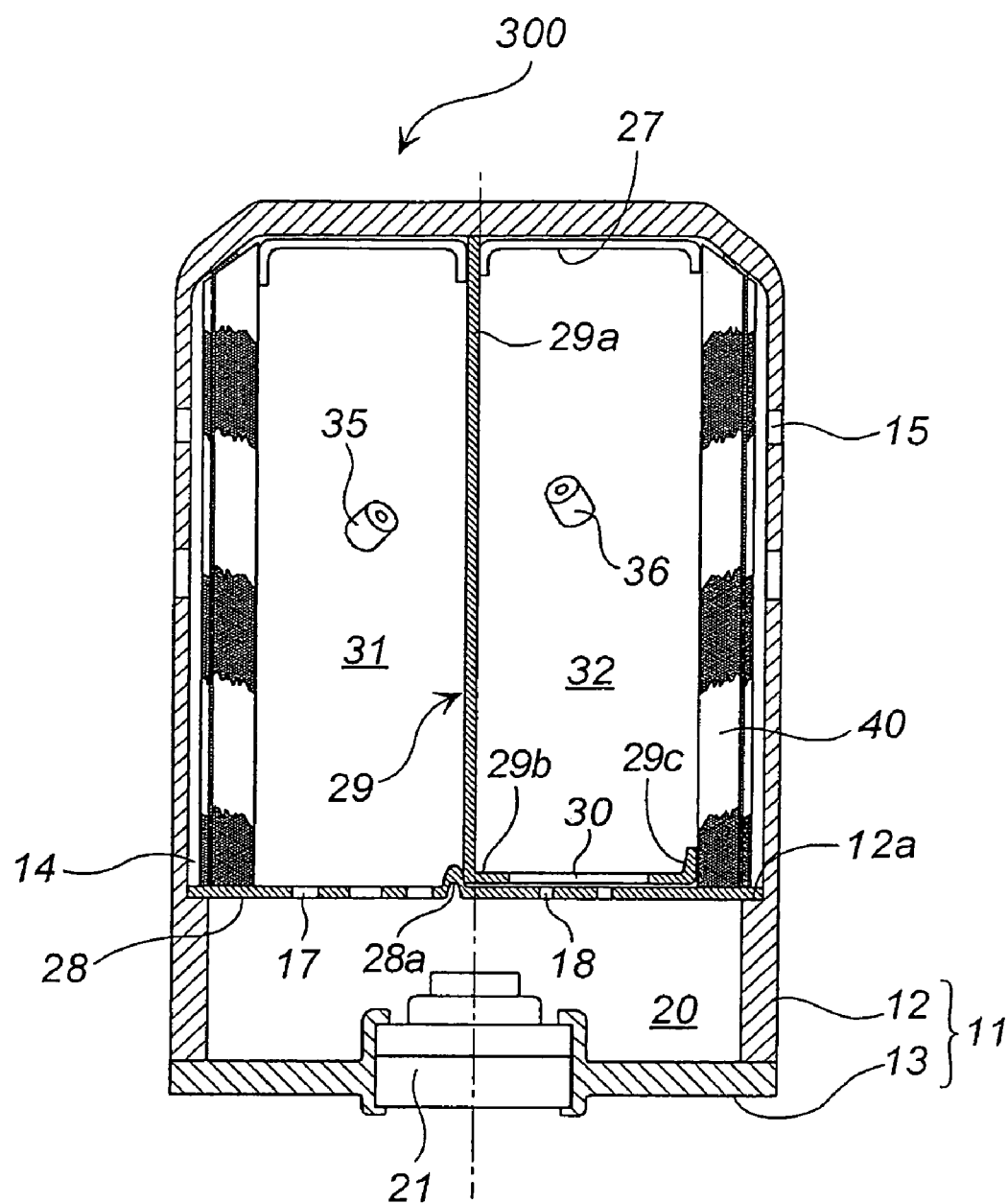
FIG. 4 shows an axial sectional view of a gas generator for an air bag.

(4) Gas Generator of FIG. 4

FIG. 4 shows an axial sectional view of an air bag gas generator 300. The basic structure of the gas generator 300 is identical to that of the gas generator 10 shown in FIG. 1, and therefore identical numbers to those of FIG. 1 denote identical elements. Note that 35 denotes a first gas generating agent, and 36 denotes a second gas generating agent.

The ignition device chamber 20 is provided in the base surface direction of the housing 11, and the first combustion chamber 31 and second combustion chamber 32 are disposed adjacent to each other in the radial direction above the ignition device chamber 20.

The ignition device chamber 20 is separated from the two combustion chambers by a partition wall 28, the partition wall 28 is fitted onto a step 12a provided in the lower portion of the diffuser shell 12, and the cylindrical coolant/filter 40 disposed on the partition wall 28 is sandwiched between the ceiling face of the diffuser shell 12 and the partition wall 28, and thereby fixed into position.

The first combustion chamber 31 and second combustion chamber 32 are divided by the partition wall 28 and a partitioning member 29. The partitioning member 29 includes an inside vertical wall 29a, a base portion 29b having an opening portion 30, and an outside annular portion 29c. The lower portion of the inside vertical wall 29a abuts against a protrusion 28a provided on the partition wall 28, the base portion 29b abuts against the partition wall 28, and the outside annular portion 29c abuts against the coolant/filter 40, with the inside vertical wall 29a principally separating the two combustion chambers.

The first communication holes 17 are provided in the partition wall 28 facing the first combustion chamber 31, and the second communication holes 18 are provided in the partition wall 28 facing the second combustion chamber 32. The second communication holes 18 are provided facing the opening portion 30 of the partitioning member 29 so that the combustion products generated upon activation of the igniter 21 are able to flow into the second combustion chamber 32.

The air bag gas generator 300 takes a vertical rectangular form, and is therefore particularly suited for use as an air bag gas generator for a front passenger side. In the air bag gas generator 300, the total opening area of the first communication holes 17 is greater than the total opening area of the second communication holes 18, and therefore the gas generator 300 performs an identical operation to the air bag gas generator 10.

Figure 5:
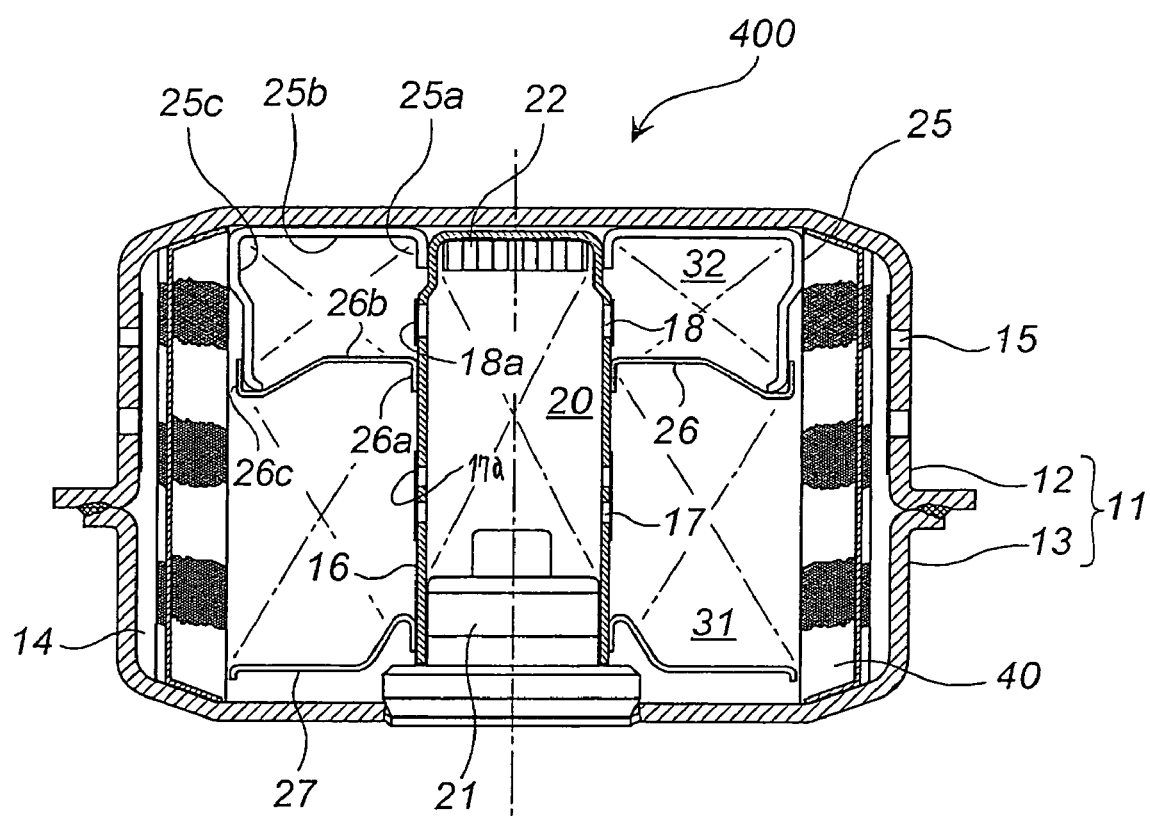
FIG. 5 shows an axial sectional view of a gas generator for an air bag.

(5) Gas Generator of FIG. 5

FIG. 5 shows an axial sectional view of an air bag gas generator 400. The basic structure of the gas generator 400 is identical to that of the gas generator 10 shown in FIG. 1, and therefore identical numbers to those of FIG. 1 denote identical elements.

The gas generator 400 of FIG. 5 differs to the gas generator 10 shown in FIG. 1 in that the total opening area of the first communication holes 17 is identical to that of the second communication holes 18, and the first communication holes 17 and second communication holes 18 are sealed by respective sealing members (stainless steel adhesive tape) 17a, 18a.

The rupturing pressure of the sealing member 17a differs from that of the sealing member 18a such that the rupturing pressure of the sealing member 17a sealing the first communication holes 17 is set smaller than the rupturing pressure of the sealing member 18a sealing the second communication holes 18. Hence during an activation, the sealing member 17a is ruptured first, thereby opening the first communication holes 17 first and allowing combustion products to flow into the first combustion chamber 31, while the sealing member 18a is ruptured at a delay, thereby opening the second communication holes 18 and allowing combustion products to flow into the second combustion chamber 32. Thus the gas generator 400 achieves a similar operation to the gas generator 10 of FIG. 1.

With the air bag gas generator of the present invention, combustion cannot be begun in the two combustion chambers at arbitrary times, as in a dual type gas generator having two igniters and two combustion chambers. However, a temporal difference can be introduced in the amount of gas that is generated from the two combustion chambers, and therefore a substantially identical air bag inflation state to that of a dual type gas generator can be achieved. Thus the structure of the gas generator can be simplified, manufacturing costs can be suppressed, and the passenger restraining performance can be enhanced.

EXAMPLES

Examples 1 to 4 and Comparative Example 1

Next, using a gas generator having the structure shown in FIG. 1, a tank pressure evaluation test (the testing method of which is well-known, being disclosed in paragraph number 98 and so on of JP-A No. 2001-97176, for example) was performed. 65 g of gas generating agent was charged into the first combustion chamber 31 of the gas generator shown in FIG. 1, and 26 g of gas generating agent was charged into the second combustion chamber 32. Both of the used gas generating agents took a single-perforated form with an outer diameter of 3.8 mm, an inner diameter of 1.2 mm, and a length of 4.1 mm, and possessed the composition described in Example 32 of JP-A No. 2004-155645 (guanidine nitrate/ basic copper nitrate/aluminum hydroxide/CMCNa=41.3/ 48.7/5/5).

Figure 6:
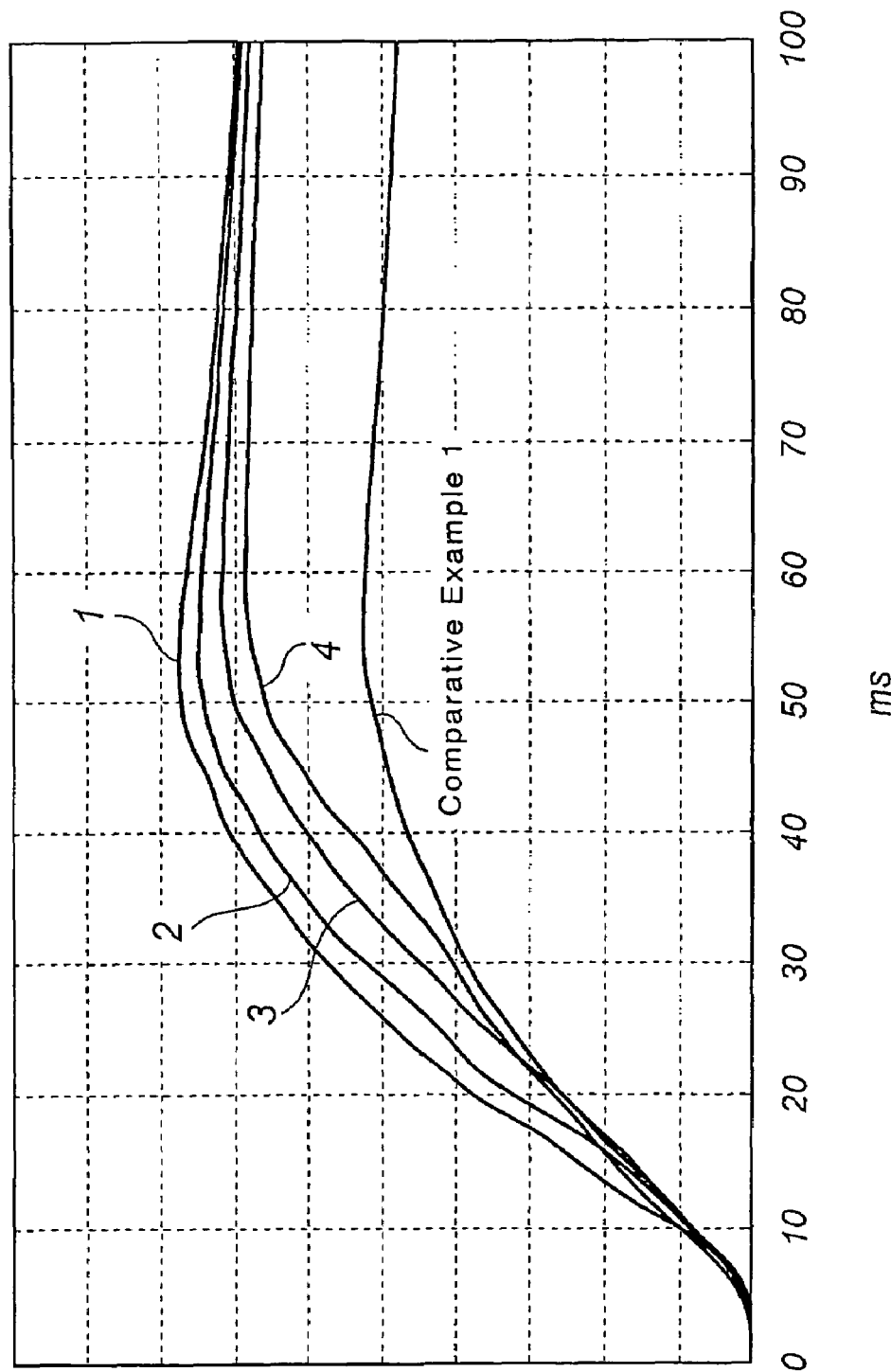
FIG. 6 shows a graph showing a tank pressure curve obtained in an example.

Further, using gas generators in which the total opening area of the second communication holes 18 formed in the inner cylinder 16 was set as 1, and the total opening area of the first communication holes 17 was set to be 6 times (Example 1), 20 times (Example 2), 40 times (Example 3), and 60 times (Example 4) greater (all other conditions being identical), the gas generators were disposed in a 60 liter tank at 20° C. and activated, whereupon pressure variation in the interior of the tank was expressed as a function of time (FIG. 6). Note that a tank pressure curve generated by burning only the gas generating agent in the first combustion chamber 31 (Comparative Example 1) is also shown in FIG. 6.

As can be seen clearly in FIG. 6, as the ratio of the total opening area of the first communication holes 17 to the total opening area of the second communication holes 18 increases, the start of combustion of the gas generating agent in the second combustion chamber 32 can be gradually delayed, and also, the completion of combustion can be delayed (i.e. the time required for the output curve to reach the maximum pressure can be delayed).

The invention thus described, it will be obvious that the same may be varied in many ways. Such variation s are not to be regarded as a departure from the spirit and scope of the invention, and all such modifications as would be obvious to one skilled in the art are intended to be included within the scope of the following claims.

The invention claimed is:

1. A gas generator for an air bag comprising:
a housing having a gas discharge port;
a plurality of combustion chambers separated by a partitioning member into a first combustion chamber and a second combustion chamber and each combustion chamber charged with a gas generating agent, provided in the housing;
a single ignition device chamber accommodating a single ignition device, provided in the housing, the single ignition device chamber communicating directly with each of the plurality of combustion chambers via communication holes, respectively;
a combustion product generated by the activation of the single ignition device, passing through the communication holes, flowing into the respective combustion chambers to ignite and burn the gas generating agent charged into each combustion chamber;
the amounts of combustion products flowing through the communication holes into the combustion chambers, respectively, being controlled, at least at the beginning of the activation, such that the amounts may be different from one another;
the partitioning member maintaining combustion in the first combustion chamber in a completely partitioned state so that gas discharge is secured to the gas discharge port, and during combustion in the second combustion chamber a gas discharge path is secured from the second combustion chamber to the first combustion chamber to the gas discharge port.

2. The gas generator for an air bag according to claim 1, wherein the communication holes of each combustion chamber have a different total opening area, and the amount of combustion products flowing into the respective combustion chambers is controlled at least at the beginning of the activation by the difference in the respective total opening areas of the communication holes such that a different amount of combustion products flows into each combustion chamber.

3. The gas generator for an air bag according to claim 1, wherein the communication holes are sealed by a sealing member, and the amount of combustion products flowing into the respective combustion chambers is controlled at least at the beginning of the activation by a difference in respective rupturing pressures of the sealing members such that a different amount of combustion products flows into each combustion chamber.

4. The gas generator for an air bag according to claim 1 or claim 2, wherein the amounts of gas generated per unit time by the gas generating agents charged into the respective combustion chambers also differ from each other.

5. The gas generator for an air bag according to claim 1 or claim 2, wherein the partitioning member moves when a difference occurs in the combustion states of the plurality of combustion chambers, and as a result of the movement, a discharge path for discharging the gas that is generated in all of the combustion chambers is secured.

6. The gas generator for an air bag according to claim 1 or claim 2, wherein the ignition device comprises an electric igniter that is activated by an ignition current, and a transfer charge that is ignited and burned by an activation of the electric igniter to generate the combustion products, and
the transfer charge is a gas generating agent having a gas output of not less than 1.2 mol/100 g.

7. A gas generator, comprising:
a housing having a gas discharge port;
a first combustion chamber provided within the housing and accommodating therein a first gas generating agent;
a second combustion chamber provided within the housing and accommodating therein a second gas generating agent;
a single ignition device chamber provided within the housing, the single ignition device chamber including a first communication hole communicating the single ignition device chamber with the first combustion chamber and a second communication hole communicating the single ignition device chamber with the second combustion chamber;
a single ignition device accommodated in the single ignition device chamber and generating a combustion product by combustion thereof, a portion of the combustion product flowing into the first combustion chamber through the first communication hole to ignite the first gas generating agent and the rest of the combustion product flowing into the second combustion chamber through the second communication hole to ignite the second gas generating agent such that an amount of the portion of the combustion product is different from an amount of the rest of the combustion product at least at the beginning of an activation of the gas generator; and wherein the first combustion chamber and the second combustion chamber are partitioned by a partitioning member, the partitioning member moves when a difference occurs in the combustion states of the first combustion chamber and the second combustion chamber, and as a result of the movement, a discharge path for discharging the as that is generated in all of the combustion chambers is secured.

8. A gas generator according to claim 7, wherein the first communication hole and the second communication hole have a different total opening area by which the amount of the portion of the combustion product and the amount of the rest of the combustion product are controlled.

9. A gas generator according to claim 7, wherein the first communication hole and the second communication hole are sealed by a sealing member which have a different rupturing pressure, respectively, by which the amount of the portion of the combustion product and the amount of the rest of the combustion product are controlled.

10. A gas generator according to claim 7, wherein an amount of gas generated per unit time by the first gas generating agent and an amount of gas generated per unit time by the second gas generating agent are different from each other.

* * * * *